United States Patent
Curran

(10) Patent No.: US 6,595,156 B1
(45) Date of Patent: Jul. 22, 2003

(54) ANIMAL RESTRAINING HALTER

(76) Inventor: Robert Edward Curran, 125 Swanwick Ave., Toronto, Ontario (CA), M4E 2A1

( * ) Notice: Subject to any disclaimer, the term of this patent is extended or adjusted under 35 U.S.C. 154(b) by 0 days.

(21) Appl. No.: 09/980,119

(22) PCT Filed: Jun. 2, 1999

(86) PCT No.: PCT/CA99/00510

§ 371 (c)(1),
(2), (4) Date: Nov. 30, 2001

(87) PCT Pub. No.: WO99/62331

PCT Pub. Date: Dec. 9, 1999

Related U.S. Application Data

(63) Continuation-in-part of application No. 09/239,814, filed on Jan. 29, 1999, now abandoned.
(60) Provisional application No. 60/087,686, filed on Jun. 2, 1998.

(51) Int. Cl.⁷ .......................... A01K 15/02; A01K 25/00
(52) U.S. Cl. ............................ 118/792; 54/71; 119/831
(58) Field of Search ............................ 54/74, 85, 6.2, 54/71; 119/792, 856, 831, 793

(56) References Cited

U.S. PATENT DOCUMENTS

| | | | | |
|---|---|---|---|---|
| 462,743 | A | * | 11/1891 | Sisson ............................ 54/24 |
| 780,879 | A | * | 1/1905 | Foster ........................ 119/831 |
| 1,746,403 | A | * | 2/1930 | Mulcahy ......................... 54/24 |
| 2,458,489 | A | * | 1/1949 | Hallander .................... 119/793 |
| 3,949,538 | A | * | 4/1976 | Woodruff ........................ 54/24 |
| 4,472,925 | A | * | 9/1984 | Woodruff ........................ 54/24 |
| 4,566,255 | A | * | 1/1986 | DeGroot ...................... 119/792 |
| 4,589,248 | A | * | 5/1986 | Ruddock ........................ 54/24 |
| 4,621,591 | A | * | 11/1986 | Anderson et al. ............ 119/831 |
| 4,722,171 | A | * | 2/1988 | Meroth .......................... 54/6.1 |
| 4,838,206 | A | * | 6/1989 | Anderson et al. ............ 119/831 |
| 4,924,815 | A | * | 5/1990 | Halla ........................... 119/864 |
| 5,079,904 | A | * | 1/1992 | Berube .......................... 54/24 |
| 5,317,989 | A | * | 6/1994 | Swanson et al. ............. 119/792 |
| D458,717 | S | * | 6/2002 | Mugford ..................... D30/152 |

FOREIGN PATENT DOCUMENTS

| | | | | |
|---|---|---|---|---|
| DE | 29803668 U | * | 5/1998 | .......... A01K/27/00 |
| FR | 2520719 A | * | 8/1983 | ............. B68B/1/00 |
| FR | 2641939 A | * | 2/1988 | .......... A01K/27/00 |

* cited by examiner

*Primary Examiner*—Yvonne Abbott
(74) *Attorney, Agent, or Firm*—Finnegan, Henderson, Farabow, Garrett, & Dunner, L.L.P.

(57) ABSTRACT

A halter (120) for controlling an animal, such as a dog, is provided having an anchor portion (146) secured across the front of the dog's head terminating at a pair of anchor points on the opposite sides of the animals neck and nape portion (128) extending across the back of the animal's neck slidably received within the anchor portion (146). The anchor portion (146) is typically placed over the snout of the dog in order to keep the halter away from sensitive tissues of the throat. When a leash connected to the nape portion is pulled, the segment (156) of the nape portion between the anchors (132, 138) pushes against the nape of the animal's neck thus stimulating a "righting" reflex and causing the animal to stop. Further control over the animal is gained by downward pressure applied to the top of the snout, stimulating a submissive behavioural response in the animal.

28 Claims, 11 Drawing Sheets

ANIMAL RESTRAINING HALTER

This application is a continuation-in-part of Ser. No. 09/239,814 filed Jan. 29, 1999, now abandoned which claims the benefit of provisional application No. 60/087,686 filed Jun. 2, 1998.

FIELD OF THE INVENTION

The present invention relates generally to the field of animal control devices, and specifically relates to a halter device for controlling an animal such as a dog.

BACKGROUND

Many restraining devices are known to handle dogs and other types of animals. These devices are used to control, limit or direct the dog's behaviour, and can range from simple collars and leashes, to more coercive devices such as choke collars.

The traditional simple neck collar typically consists of a length of leather, rope or chain which buckles or ties in a continuous loop around the neck of the dog. Usually a leash or lead is attached to the collar at one end and a dog handler will grasp the other end of the lead. This method of restraint requires the handler to exert a pulling force equal to or greater than the opposite force exerted by the animal. This type of restraining device can be ineffective, as a handler weaker than the animal may not be able to control the animal or can be injured from sudden unexpected acceleration by the animal. Furthermore, the handler's grip can fail, thereby allowing the dog to escape.

This problem is acerbated by the natural proprioceptive reflex of the animal that will cause it lean into an applied force. The tension applied to the collar therefore causes the animal to pull harder and the required response has to be learnt rather than rely on a natural reflex.

A further disadvantage to the neck collar is that, in use, the collar exerts pressure on the front of the animals neck under the chin thus exposing the animal to risk or injury to sensitive tissues in the throat, such as the cervical vertebrae, trachea and larynx. Moreover, some animals have a neck of greater circumference than the head, which makes the collar ineffective as it may slip over the head and allow the animal to escape. Various modifications have been proposed to overcome these difficulties.

The choke chain is frequently used on a dog and typically comprises a single length of chain having a metal guide or ring attached to one end. The dog handler forms a loop by threading the opposite end of the chain through the metal ring. The loop is then enlarged to fit over the dog's head and is positioned to encircle the dog's neck. A leash is then attached to the opposite end of the chain. Accordingly, the loop contracts about the dog's throat when the leash is pulled. It will be apparent that a choke chain is more coercive than the simple collar, and that the choke chain can result in serious damage to the dog's neck. Indeed if the choke chain is used with an unattended dog left anchored to fixed object, the dog can strangulate itself.

The choke chain is based on a theory of dog training which states that an adverse stimulus on the dog can be used to dominate the dog and therefore train the dog. However, it is known that the use of pain to control a dog requires a cognitive response on the part of the dog, such that the dog must be aware of the pain and then make a decision as to how to respond. While periodic "pain" conditioning can result in the dog making the decision to 'stop' based on receiving the pain reflex, it can also antagonize some dogs into extremely violent behaviour. Accordingly, may contemporary animal theorists believe that such training is unnecessarily brutal, ineffective and clumsy.

A variant of the choke chain is a prong-type collar which includes metal projections to press into the skin of the dog's neck when the dog handler jerks the leash. Similar to the choke chains, prong-type collars force prongs into the dog's neck to condition the dog to stop the undesired behaviour. It will be apparent that prong-type collars suffer from the same disadvantages as regular choke collars.

Other devices, such as muzzles, have been used to encase the snout or muzzle of the dog. The devices typically comprise a cage which surrounds the dog's snout and teeth. However, these devices merely physically prevent the dog from biting people or other dogs and do not condition or train the dog to stop its undesired behavior.

As an alternative to the collar, dog harnesses have also been used to distribute the leash pulling force more evenly over neck and chest of the dog. These devices are intended to "harness" a dog's pulling energy, and are not intended to provide a command useful for stopping the dog.

Another group of dog training and behavior control devices has been developed to address some of the problems discussed above. One such device is known as a Halti™ and is disclosed as a canine halter in Canadian Industrial Design No. 56,430 issued to Mugford. This canine halter includes a neck strap which is worn around the neck of the dog. The neck strap is connected to a short strap extending forwardly under the dog's lower jaw and connecting to a metal ring. A is positioned over the top of the dog's snout and extends downwardly through the metal ring. A second ring is provided for attaching a leash to the lower part of the nose band below the dog's lower jaw in front of the neck.

In operation, the dog handler walks with the dog on one side and holds the leash loosely. This permits the nose band to remain in a generally slack or loose condition about the dog's snout. If the dog exhibits undesirable behaviour, such as pulling or refusing to walk, the dog handler pulls on the leash, thereby tightening the nose band about the dog's snout.

Another similar device is described in U.S. Pat. No. 4,941,313 to Anderson. This patent discloses a combination collar and muzzle training aid which includes a collar that encircles the neck of the dog immediately behind the ears. A separate muzzle loop encircles the upper and lower jaws and extends downwardly through a ring carried on the collar below the dog's lower jaw. A leash is attached to a part of the muzzle loop which extends through the ring below jaw of the animal.

In operation, if the leash is pulled in a forward direction the muzzle loop of the Anderson device contracts and applies pressure to the dog's muzzle. It is prevented from slipping off the muzzle by transferring the pulling force to the collar through the ring.

Unfortunately, the design of the Halti™ and Anderson animal control devices have a number of disadvantage. These devices may cause a twisting force to be applied to the dog's head and neck when the leash is pulled from a location at the side or rear of the dog, which are the usual positions for the handler when walking the dog. This twisting force is caused by locating the leash attachment point on the nose band below the dog's lower jaw in front of the neck. As the leash is pulled to stop the undesired behaviour, the lower leash attachment point is drawn toward the dog handler, thereby forcing the dog's neck to twist. This twisting action may increase the change of injury to the dog's neck if the leash is pulled too abruptly.

A further disadvantage of these devices also relates to the leash attachment location below and near the lower jaw. If the dog is nervous or agitated and prone to biting, the dog handler is forced to attach the leash near the dog's teeth, below the lower jaw. This is undesired because it increases the chance of a dog bite injury to the handler.

Also, the Halti™ and Anderson dog control devices are usually removed from the dog and replaced with a conventional collar after a dog-training period has ended. However, this requires the dog owner to purchase two devices, a training device and a conventional collar, thereby increasing dog ownership costs.

It is therefor an object of the present invention to provide a novel animal halter device which obviates or mitigates at least one of the disadvantages of the prior art.

SUMMARY OF THE INVENTION

In a broad embodiment, the invention provides a halter for controlling an animal comprising a halter comprising an anchor portion to extend across a forward facing portion of an animals head, a nape portion connected to said anchor portion and extending across a rearward facing portion of an animals head and a tether connector connected to said nape portion, said anchor portion and said nape portion being connected such that when said connector is pulled rearwardly relative to said animal head, said nape portion pushes against said rearward facing portion.

The halter of the foregoing embodiments is particularly suited to an animal such as a dog or a horse, but can be suitable for other animals.

BRIEF DESCRIPTION OF THE DRAWINGS

Embodiments of the present invention will now be described by way of example only, with reference to the attached Figures in which.

DETAILED DESCRIPTION OF THE DRAWINGS

Figure 1:
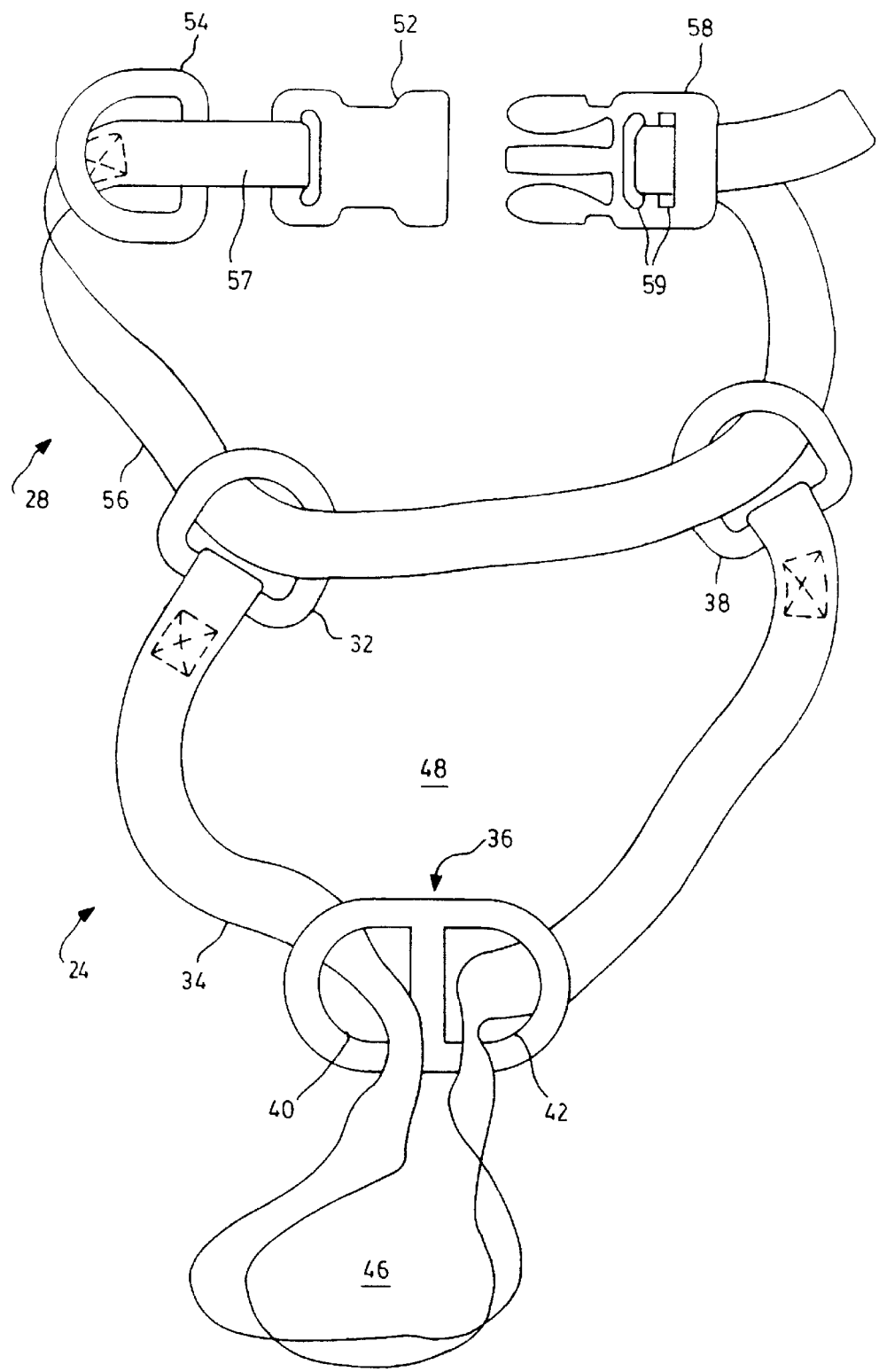
FIG. 1 is a front elevation view of a halter.

A halter is indicated generally at 20 in FIG. 1. Halter 20 comprises an anchor portion 24 and a nape portion 28. Anchor portion 24 comprises a strap 34 passing through a constraint 36 and terminating at a first anchor 32 and a second anchor 38. Anchors 32, 38 are preferably plastic D-rings, but other suitable anchors will occur to those of skill in the art. Anchors 32, 38 are permanently attached to each end of strap 34 by threading each end of strap 34 through the flat portion of each anchor, and stitching each end onto the adjoining portion of strap 34. Strap 34 is preferably nylon webbing, but can also be leather or any other suitable material as will occur to those of skill in the art.

Constraint 36 is formed as a double D ring having two apertures 40,42. Each aperture 40,42 slidably receives a segment of strap 34. The threading of strap 34 through apertures 40,42 provides a snout loop 46 and a neck portion 48 on the anchor portion 24.

Nape portion 28 comprises a strap 56 that passes through the anchors 32,38 with a female buckle component 52, and a male buckle component 58 at opposite ends. Female and male buckle components 52,58 are preferably plastic and are complementary, such that male buckle 58 can be inserted into female buckle 52 to releasably retain male buckle 58 within female buckle 52 and form a continuous loop. A leash clip 54 is located on the strap 56 and is preferably a plastic or metal D-ring.

In the present embodiment, female buckle 52 and leash clip 54 are permanently attached to the strap 56 by a sewn loop 57 while male buckle 58 may slide along the strap 56 for adjustment. The male buckle 58 has a pair of spaced openings 59 that allow the strap 56 to be threaded through and to bind against one another when tension is applied. It will be understood that buckles 52, 58 can affixed to strap 56 in other configurations.

Figure 2:
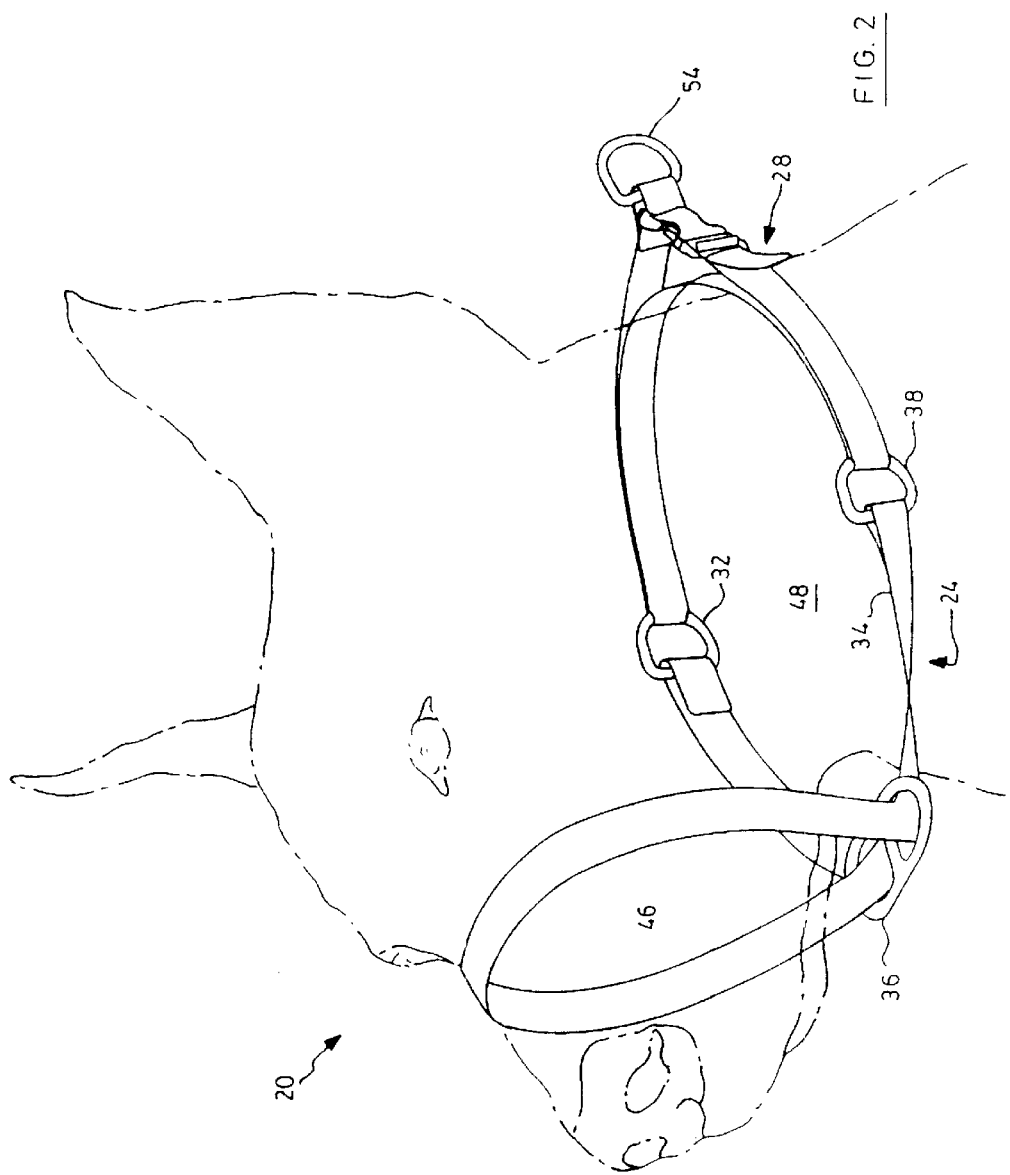
FIG. 2 is a perspective view of the halter of FIG. 1 fitted on to a dog.
Figure 3:
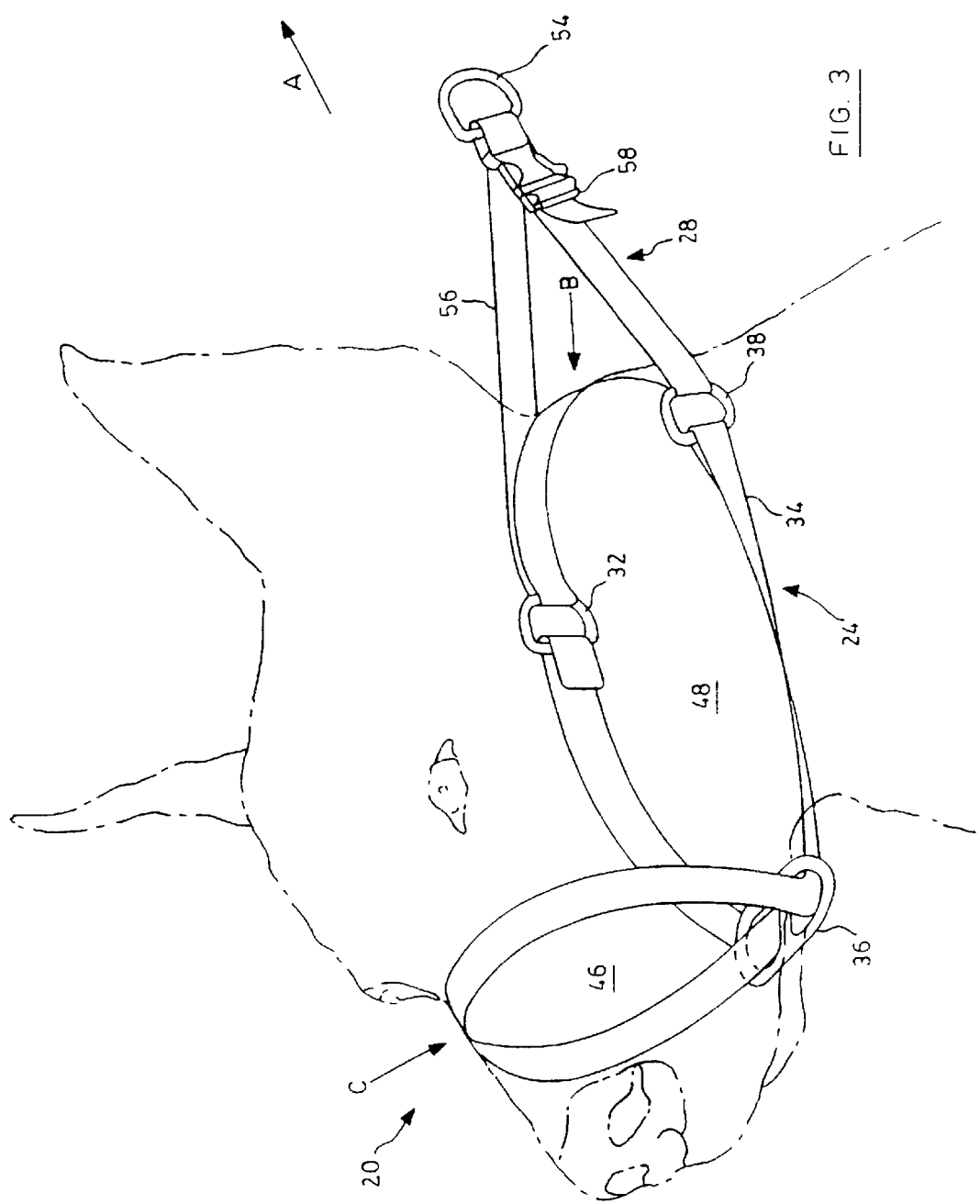
FIG. 3 is a perspective view of the halter of FIG. 2 wherein a pulling force is being applied to the halter.

Referring now to FIGS. 2 and 3, a dog is shown wearing halter 20. Anchor portion 24, which reduces contact with the sensitive tissues on the front anchor portion 24, is fitted with the snout loop 46 around the muzzle of the dog and the constraint 36 underneath the chin. The ends of strap 34 defining the neck portion 48 pass to opposite sides of the head so that anchors 32, 28 are generally fitted under each of the dog's ears. The nape portion 28 extends across the nape or back of the dog's neck and the end of strap 56 can be adjusted in relation to male buckle 58 to enlarge or reduce the size of nape portion 28 to assist in the fitting. During fitting, constraint 36 can be moved along the length of strap 34 so as to enlarge or reduce the size of snout loop 46, but it is generally preferred that snout loop 46 remain loose enough for the dog to freely open its mouth.

In operation, an animal tether or leash (not shown) is attached to leash clip 54 and held by the dog's handler. As shown in FIG. 2, the leash is held, but not pulled by the handler and accordingly, halter 20 is in a released position with the nape portion 28 resting on the back of the dog's neck. In addition, snout loop 46 rests on the dog's snout. The released position is generally used to walk the dog, and accordingly halter 20 allows the dog to move freely within the limits of the length of the leash.

In order to control the dog, tension is applied to the leash and as shown in FIG. 3, as the dog pulls away from the handler, a force is created along the length of the leash, as indicated by arrow "A". The tension will act through the anchors 32,28 to try to collapse the nape portion 28 and pulls on anchor portion 24. However, because anchor portion 24 is generally secured about the dog's snout, anchors 32, 38 remain substantially fixed along the sides of the dog's neck and function as a force reverser or fulcrum. Accordingly, as the dog pulls, the portion of strap 56 between anchors 32, 28 that is in contact with the dog's neck will push against the back of the dog's neck, as indicated by arrow "B". This stimulates a proprioceptive or "righting" reflex in the back of the neck along the contact area, and the dog responds by leaning back to counter the force exerted by strap 56. Usually this is sufficient to impede the progress of the dog and slacken the leash. If however, the dog continues pulling, the pulling force "A" is transferred through the constraint 36 into a circumferential force that causes the snout loop 46 to constrict about the dog's muzzle. This urges the jaws shut and restricts the dog's means of aggression, thereby further gaining control over the dog. Additionally, the continued application causes a downward pressure to be felt on the top of the dog's snout and stimulates a behavioural response of submissiveness, as indicated by arrow "C". During this period, the nape portion 28 maintains force generating the proprioceptive reflex and accordingly, the dog will "stop" pulling against the leash.

It will we apparent that by providing the anchor points, a force can be generated by the nape portion 28 that causes a natural reflex action to produce the desired result.

Figure 4:
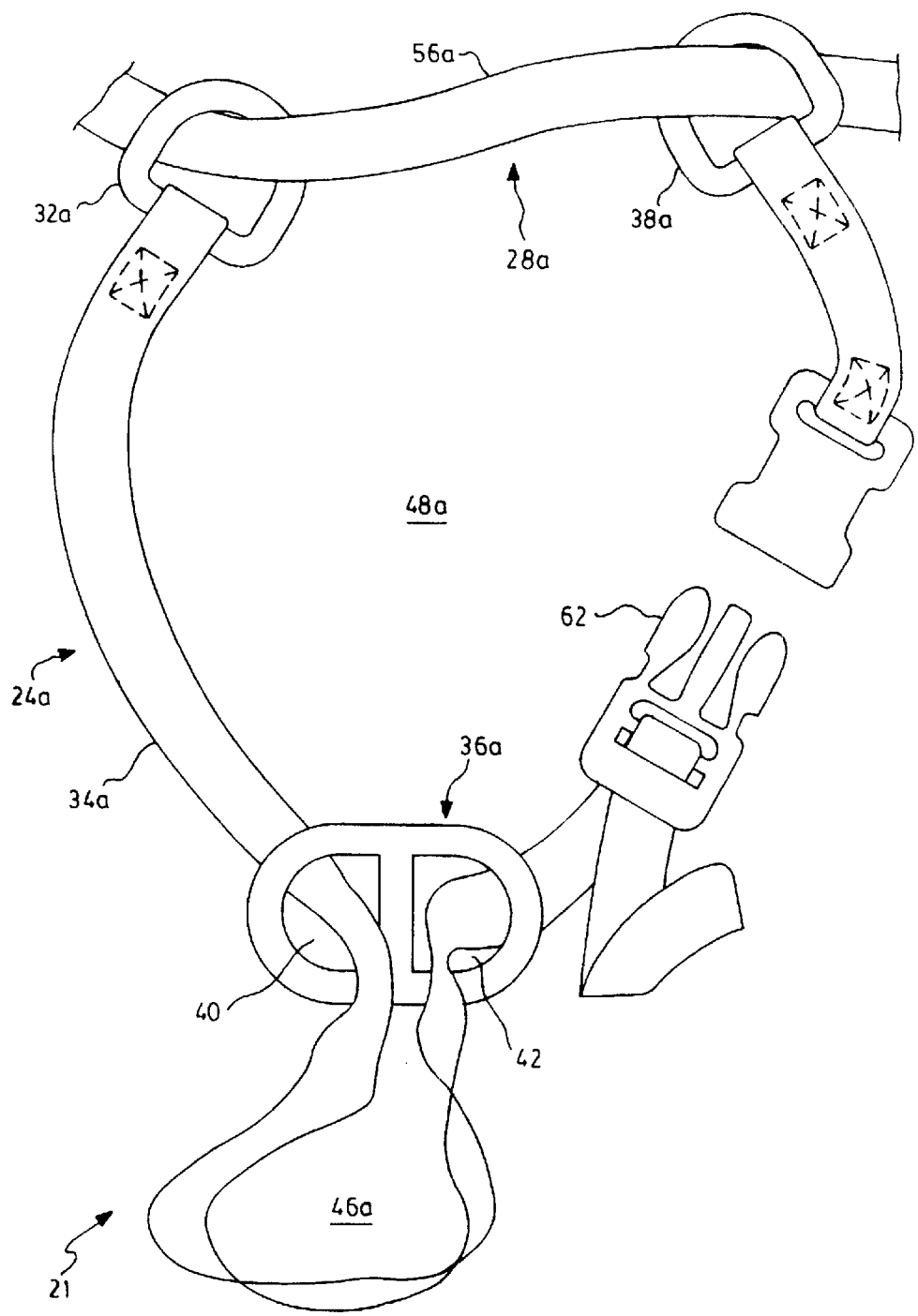
FIG. 4 is a front partial view of a second embodiment of a halter which is convertible into a simple collar.

Referring now to FIG. 4, a second embodiment of the present invention is indicated generally as halter 21. Like items to previous embodiments are indicated by like numbers with a suffix 'a' for clarity. In the second embodiment an adjustment buckle 62 is inserted into strap 34a to allow for adjustment of the length of anchor portion 24a. This not only facilitates fitting of the anchor portion 34a but also permits halter 21 to be converted into a simple collar. To achieve this, the constraint 36a in the central portion of strap 34a is adjusted to eliminate the snout loop 46a, with buckle 62 adjusting the length of strap 34a. In this fashion, anchor portion 24a and nape portion 28a combine to form a simple collar about the dog's neck.

Figure 5:
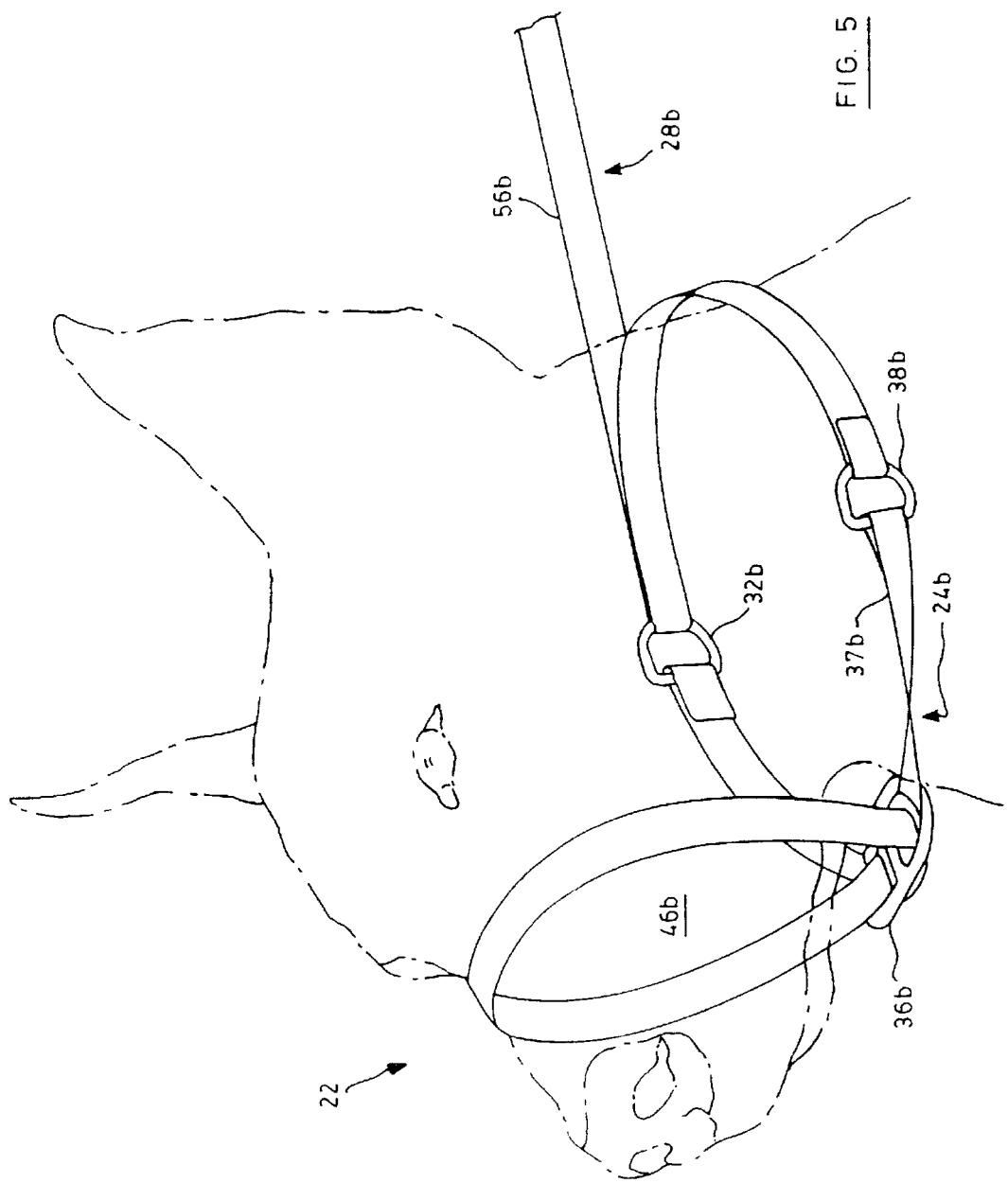
FIG. 5 is a perspective view of a halter in accordance with another embodiment of the invention fitted onto a dog.

Referring to FIG. 5, a third embodiment of the present invention is indicated as halter 22. Like items to previous embodiments are indicated by like numbers with a suffix 'b' for clarity. In the third embodiment, nape portion 28b is simply a length of strap 56b secured at one end to anchor 38b, and threaded through anchor 32b so that the opposite end can be held by the dog handler. By pulling on the opposite end, the portion of strap 56b between anchors 32b, 38b pushes against the back of the dog's neck, thereby stimulating the dog's proprioceptive reflex along the back of the neck. It will be apparent that, in the third embodiment, anchor 38b simple joins anchor portion 24 to nape portion 28b, and if preferred a single continuous strap may be used to eliminate anchor 38b.

Figure 6:
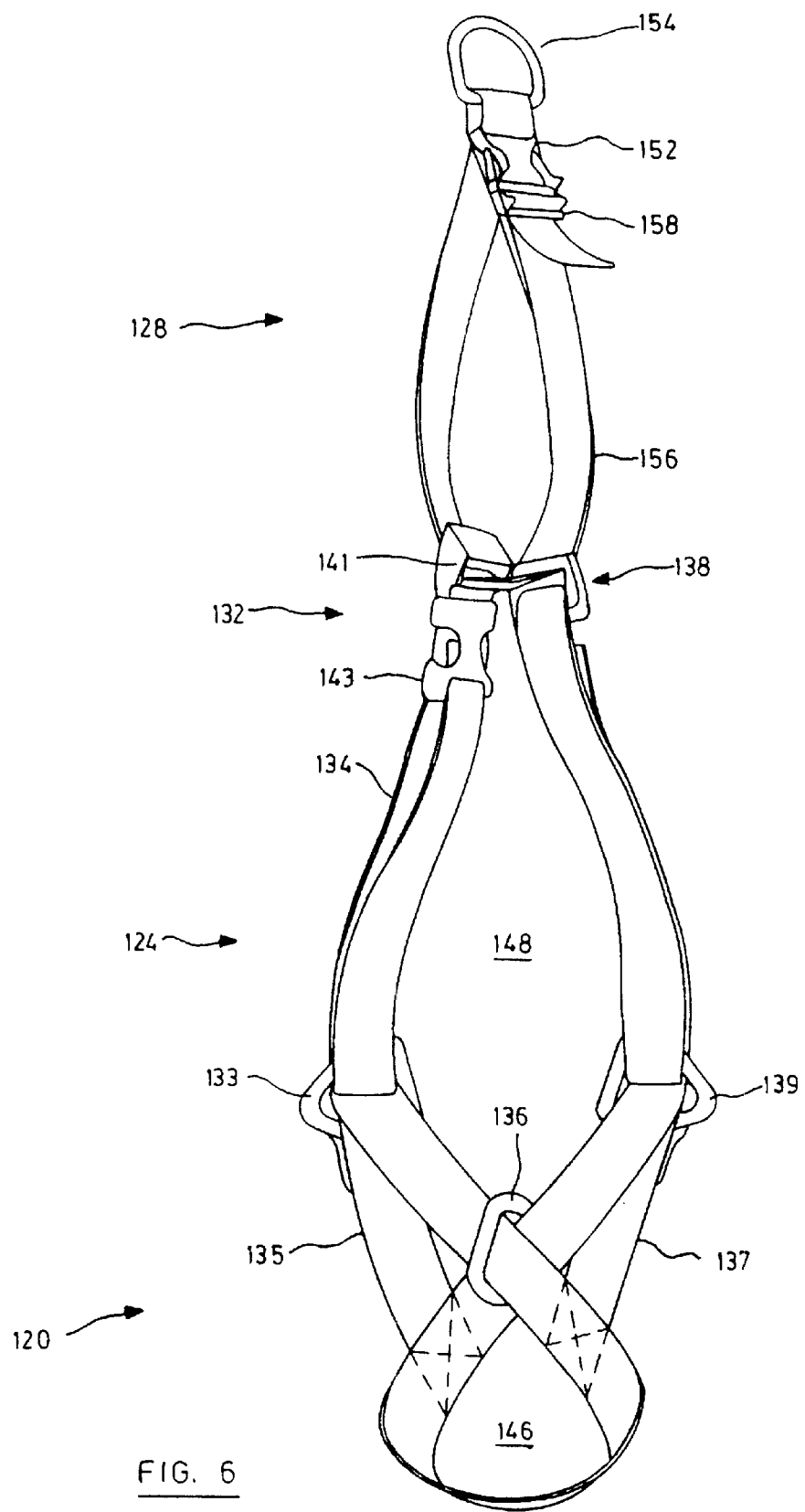
FIG. 6 is a front elevational view of a halter in accordance with another embodiment of the present invention.

Referring now to FIG. 6, a fourth embodiment of the present invention is indicated as halter 120. Like items to previous embodiments are indicated by like numbers with a prefix 1 for clarity. Halter 120 comprises an anchor portion 124 and a nape portion 128. Anchor portion 124 comprises a neck strap 134 that extends between a first anchor 132, a first guide-ring 133, and a constraint 136, and a second guide-ring 139, to a second anchor 138.

Nape portion 128 is substantially the same as described in the first embodiment, and comprises a female buckle 152, strap 156 and male buckle 158. Right and left cheek straps, 135, 137 respectively extend from the guide-rings 133, 139 and selected locations on the strap 134.

Referring in more detail to anchor portion 124, first anchor 132 is preferably a two-part buckle, having a male buckle component 141, which slidably receives strap 156 of nape portion 128, and a female buckle component 143 which slidably receives neck strap 134. Second anchor 138 is preferably a one-part buckle or a guide-ring having a pair of spaced bars with strap 156 slidably received around one bar and neck strap 134 slidably received through the other half. Neck strap 134 is continuous, being affixed at a first end to first guide-ring 133 and threaded through female buckle 143. Strap 134 passed back on itself and through first guide-ring 133 and through constraint 136, where it is looped to form a snout loop 146, as it passes back through constraint 136. It then passes through second guide-ring 139 and is threaded through second anchor 138 to terminate at a second end affixed to second guide-ring 139. Thus, the threading of strap 134 forms snout loop 146 and a neck portion 148.

Additionally, right cheek strap 135 is affixed at a first end to first guide-ring 133, and at its opposite end to strap 134 on snout loop 146 proximal to the dog's right cheek. Similarly, left cheek strap 137 is affixed at a first end to second guide-ring 139 and at its opposite end to strap 134 on snout loop 146 proximal to the dog's left cheek. Together, cheek straps 135 137 combine to provide structural support to snout loop 146. Other variations to the configurations of the cheek straps 135, 137 will occur to those of skill in the art.

Figure 7:
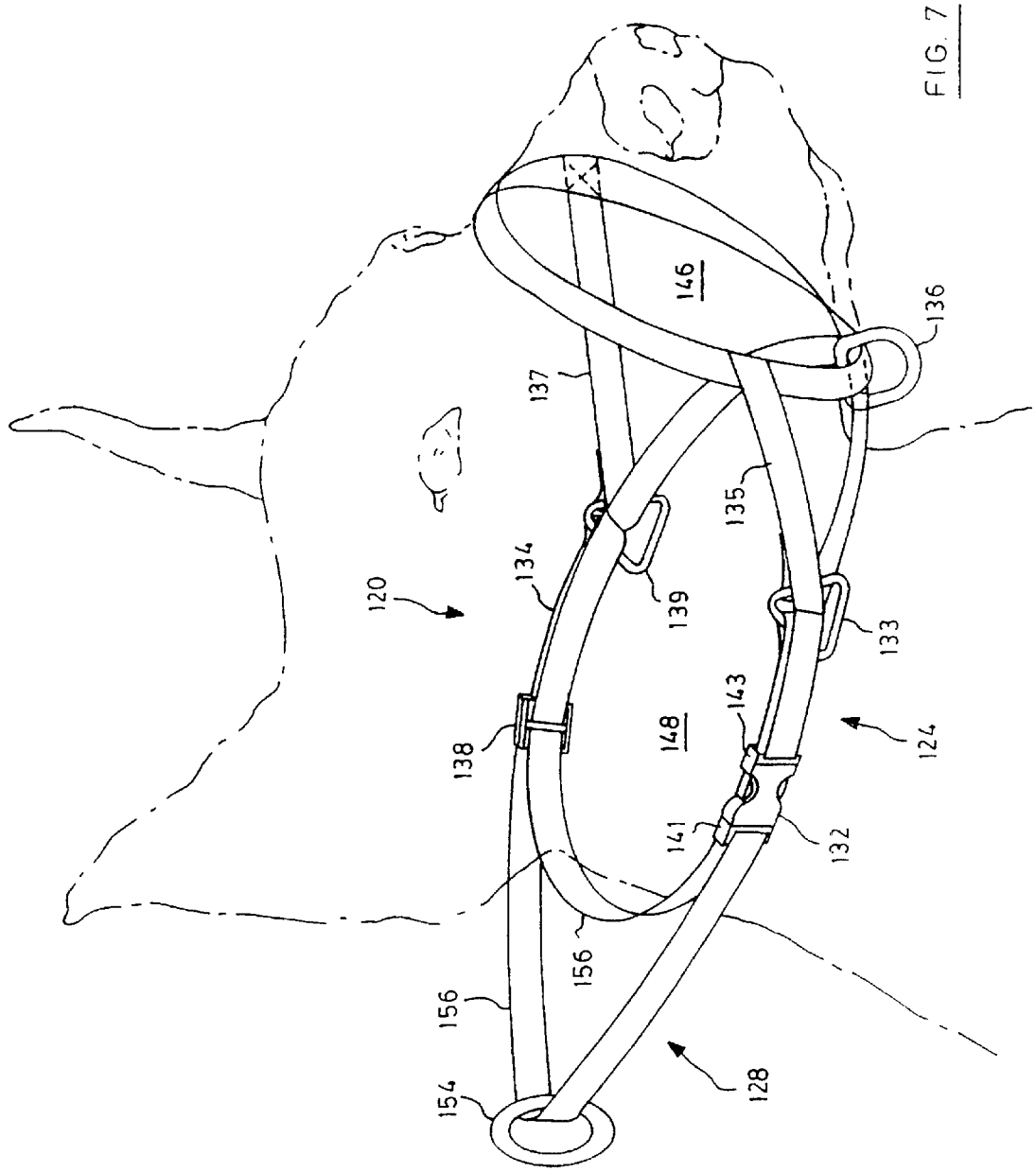
FIG. 7 is a perspective view of the halter of FIG. 6 fitted onto a dog.
Figure 8:
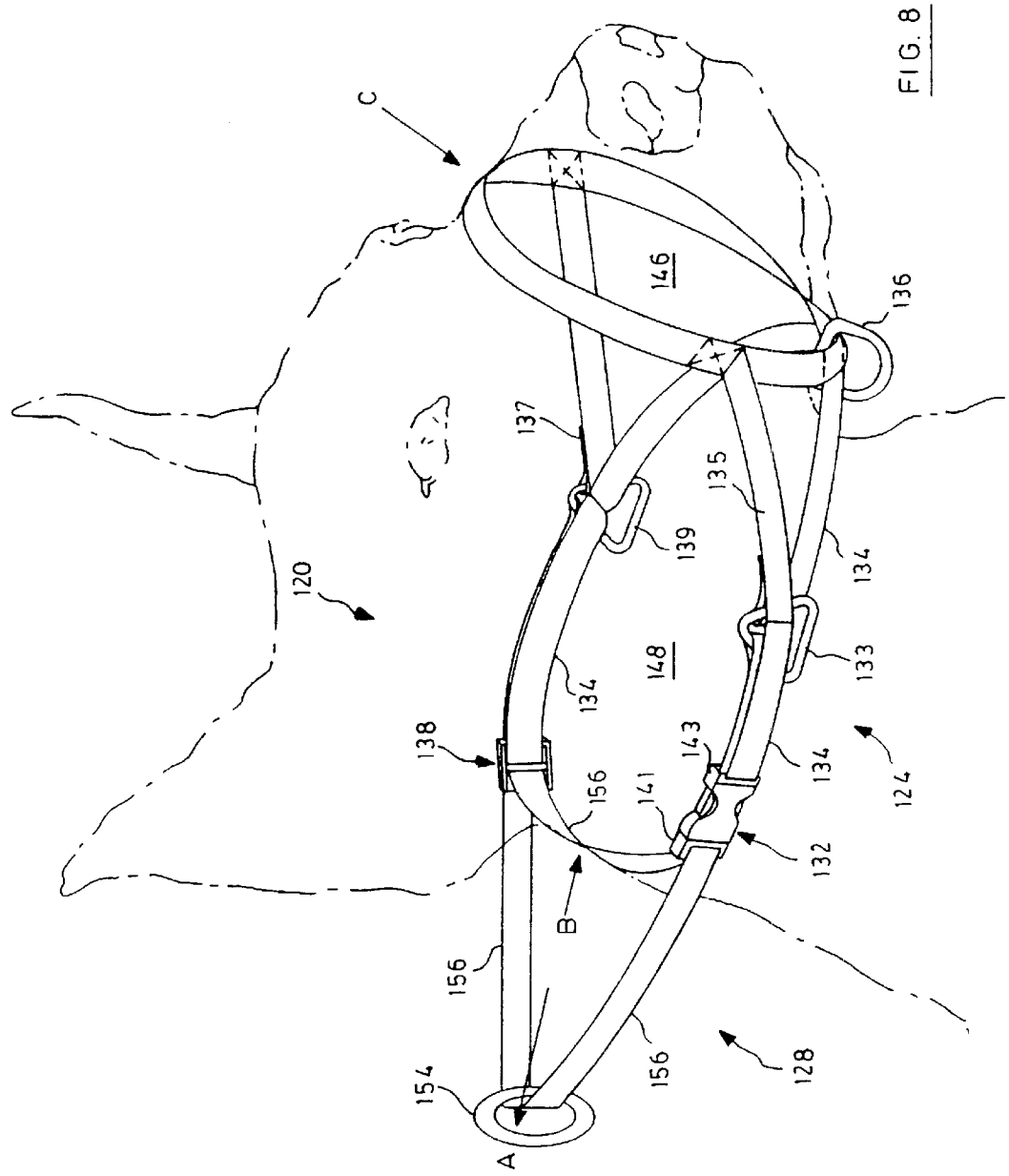
FIG. 8 is a perspective view of the halter of FIG. 6 wherein a puling force is being applied to the halter.

Referring now to FIGS. 7 and 8, a dog is shown wearing halter 120. Snout loop 146 fits over the snout of the dog by expanding loop 146 and then sliding it over the dog's snout, such that cheek straps 135, 137 are adjacent to the dog's cheeks. The crossing of the neck strap 134 obviates the need for the constraint 136 but its inclusion helps to define the snout loop 146 and also provides an alternative location for the tether in some circumstances. When fitted, constraint 136 hangs under the dog's chin as shown in FIGS. 7 and 8. Nape portion 138 and neck portion 148 are fitted over the dog's head, such that neck portion 148 extends across the sides of the dog's neck, and nape portion 128 extends across the nape or back of the dog's neck. It will be apparent that male buckle 141 can be disengaged from female buckle 143 to facilitate encircling neck portion 148 about the dog's neck.

As shown in FIG. 7, anchors 132, 138 are fitted generally underneath each of the dog's ears and along the sides of the dog's neck. Guide-rings 133, 139 are fitted slightly farther towards the front of the dog's head. Strap 156 can be adjusted in relation to male buckle 141 to enlarge or reduce the size of nape portion 128 to assist in the fitting.

It is to be understood that the foregoing description is in reference to FIGS. 7 and 8, but the exact fitting of anchors 132, 138 and guide-rings 133, 139 which facilitates the optimal fitting of halter 120 will vary with the size and the shape of the dog's head and neck.

As will now be apparent to those of skill in the art, the adjustable features of halter 120 in the present embodiment allow the use of the halter on a range of sizes and breeds of dogs.

In operation, a leash (not shown) is attached to leash clip 154 and held by the dog's handler. As shown in FIG. 7, the leash is held, but not pulled by the handler. Accordingly, halter 120 is in a released position as nape portion 128 rests on the back of the dog's neck. In addition, snout loop 146 rests on the dog's snout, but does not slide off of the snout. The released position is generally used to walk the dog, and accordingly halter 120 allows the dog to move freely within the limits of the length of the leash.

As shown in FIG. 8, in order to control the dog the leash is simply held firmly so that as the dog pulls away from the handler, a force is created along the length of the leash, as indicated by arrow "A". Accordingly, nape portion 128 pulls on anchor portion 124 and due to the configuration of anchor portion 124, the pulling force is reacted through the anchors 132, 138 that are urged towards the back of the neck. Concurrently, the portion of strap 156 between anchors 132, 138 that is in contact with the dog's neck slides relative to the anchors 132, 138 and will push against the back of the dog's neck, as indicated by arrow "B". This stimulates a proprioceptive or "righting" reflex in the back of the neck along the contact area, and the dog responds by leaning back to counter the force. The pulling force "A" also causes the snout loop 146 to constrict about the dog's muzzle, thus urging the jaws shut and restricting the dog's means of aggression, thereby further gaining control over the dog. Additionally, downward pressure on the top of the dog's snout stimulates a behavioural response of submissiveness, as indicated by arrow "C". Accordingly, the dog will "stop" pulling against the leash.

Figure 9:
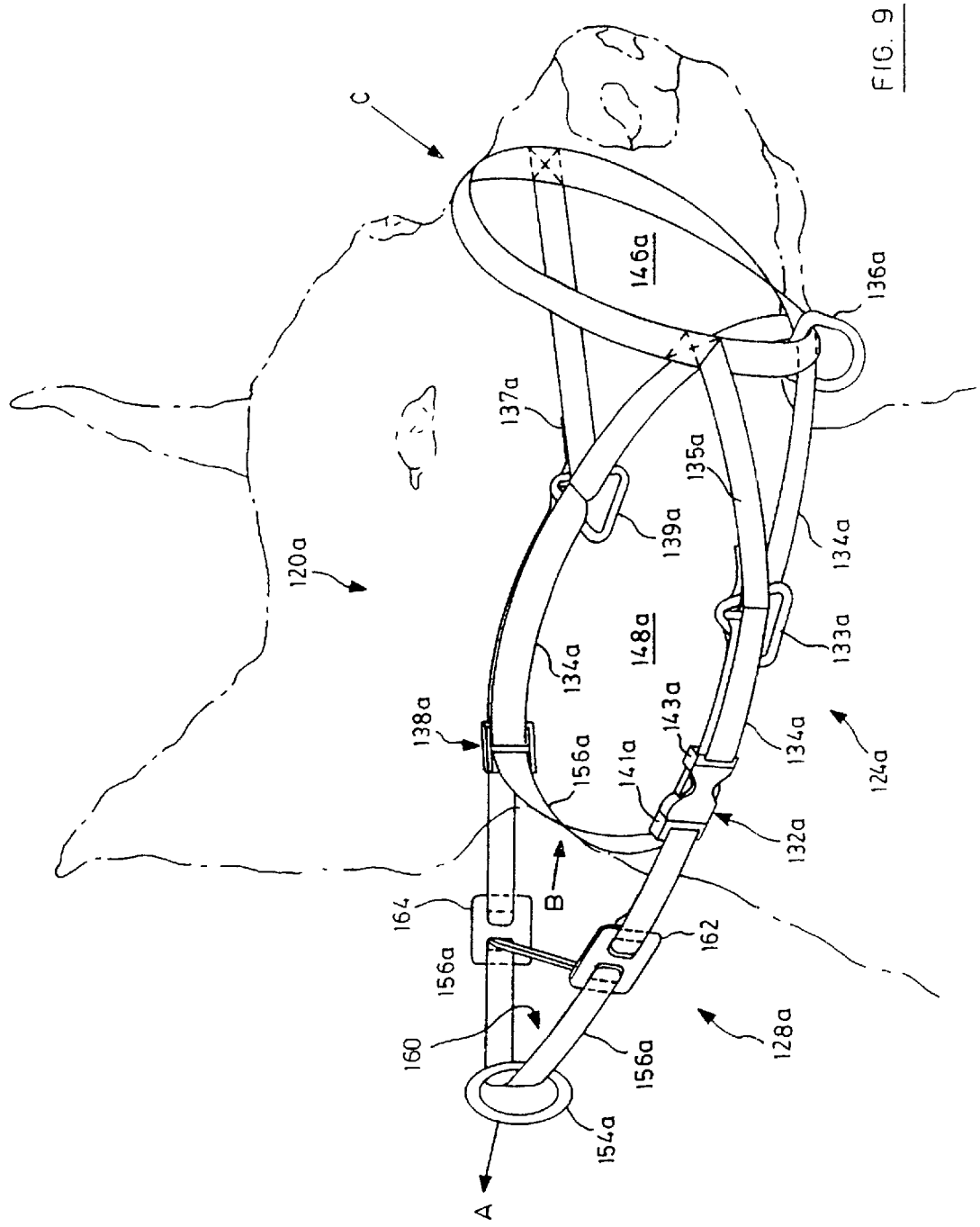
FIG. 9 is a perspective view, similar to FIG. 8 of a further embodiment of halter.
Figure 10:
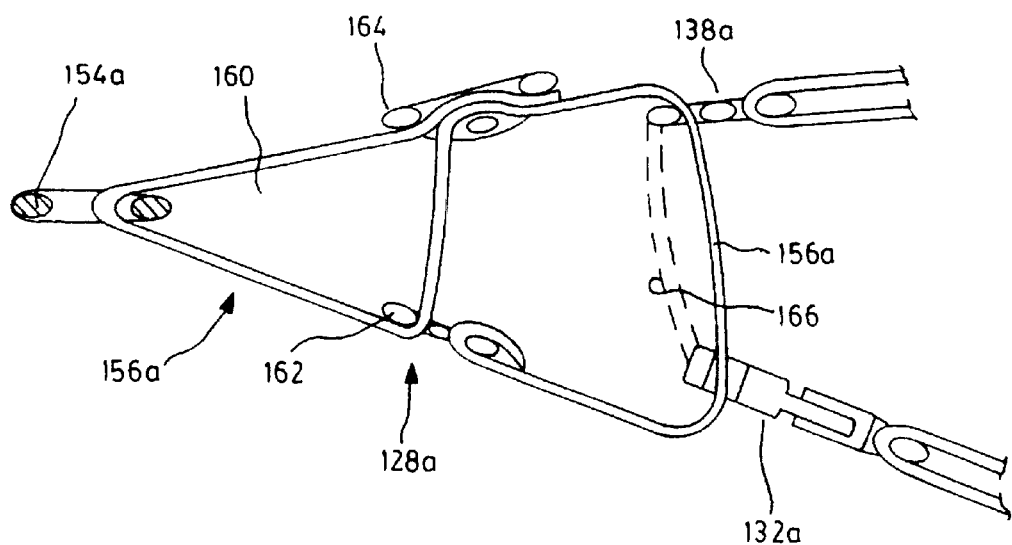
FIG. 10 is a schematic plan view of a portion of the halter of FIG. 9.

A further enhancement of the halter of FIGS. 6 to 8 is shown in FIGS. 9 and 10 with like reference numerals denoting like components with a suffix "a" added for clarity. In the embodiment of FIGS. 9 and 10, the nape portion 128a is formed with an additional running loop 160 that provides additional control for the handler. As can be seen in FIG. 10, the strap 156a is formed in to a serpentine triangular configuration with the leash connecting ring 154a and the anchors 132a, 138a at the apexes. A pair of buckles 162, 164 are located on the strap 156a between the anchors 132a, 138a and ring 154a.

The strap 156a is secured to one loop of the buckle 162 and passes through the anchors 132a, 138a across the rearwardly directed portion of the dog's head. The strap then passes around the center bar of the buckle 164 and across to the second loop of the buckle 162. It then passes through the ring 154a and back to the buckle 164 where it is threaded through each of the loops to overlie the initial pass of the strap. The strap is free to slide through the anchors 132a, 138a, ring 154a and buckle 162 but is frictionally held by the buckle 164. The overall free length of the strap 156a can be adjusted at the buckle 164 and the relative size of the two loops adjusted by varying the position of the buckle 164 along the run of the strap 156a.

This arrangement permits the muzzle loop 146a to be tightened and held in a closed position where required, for example when being examined by a vet, but still provides a loop to allow the vet to control or hold the dog. The ability to fit the nape portion 128a snugly about the back of the animals head also inhibits accidental removal of the harness 120a if the dog backs away from the handler and tends to pull the halter over the head.

As a further enhancement, an elastic cord 166 can be fitted between the anchors 138a, 132a to provide a spring resistance to the opening of the jaws. This allows initial opening but repetitive opening, such as when barking, will rapidly tire the dog and cause it to rest from such activity. Alternatively, selected parts or all of the halter 120a may be made from elastic material such as elastic nylon webbing to obtain a similar effect.

It will be understood that the present invention can be readily modified to suit special needs of dog handlers. For instance multiple halters may be utilised with an entire dogsledding team or the halter could be made from a thin rope to be used with show dogs, where it is important that a control devices are less visible to an audience.

It will be understood by persons of skill in the art that while the present embodiment is directed to digs, the invention can be readily tailored for controlling horses or other animals in several fashions as will occur to those of skill in the art. An embodiment of the harness fitted to a horse is shown in FIGS. 11 and 12 where like components are identified by like reference numerals with a prefix 2 added for clarity.

Figure 11:
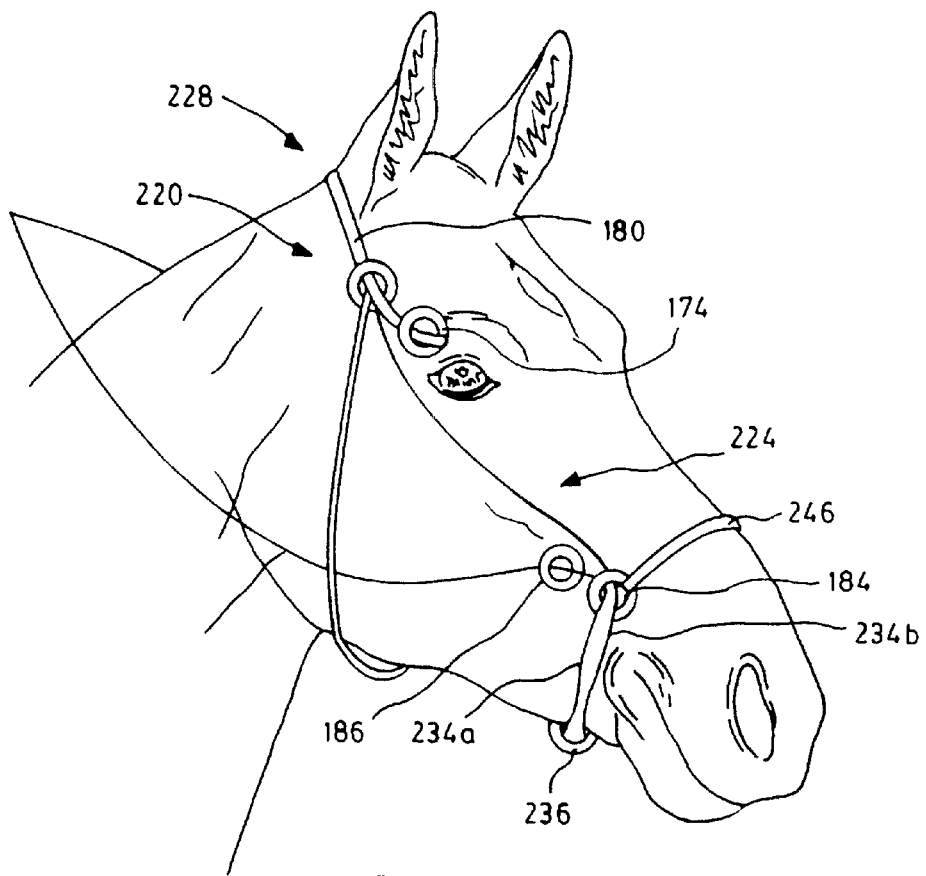
FIG. 11 is a perspective view of a further embodiment of halter fitted to a horse.
Figure 12:
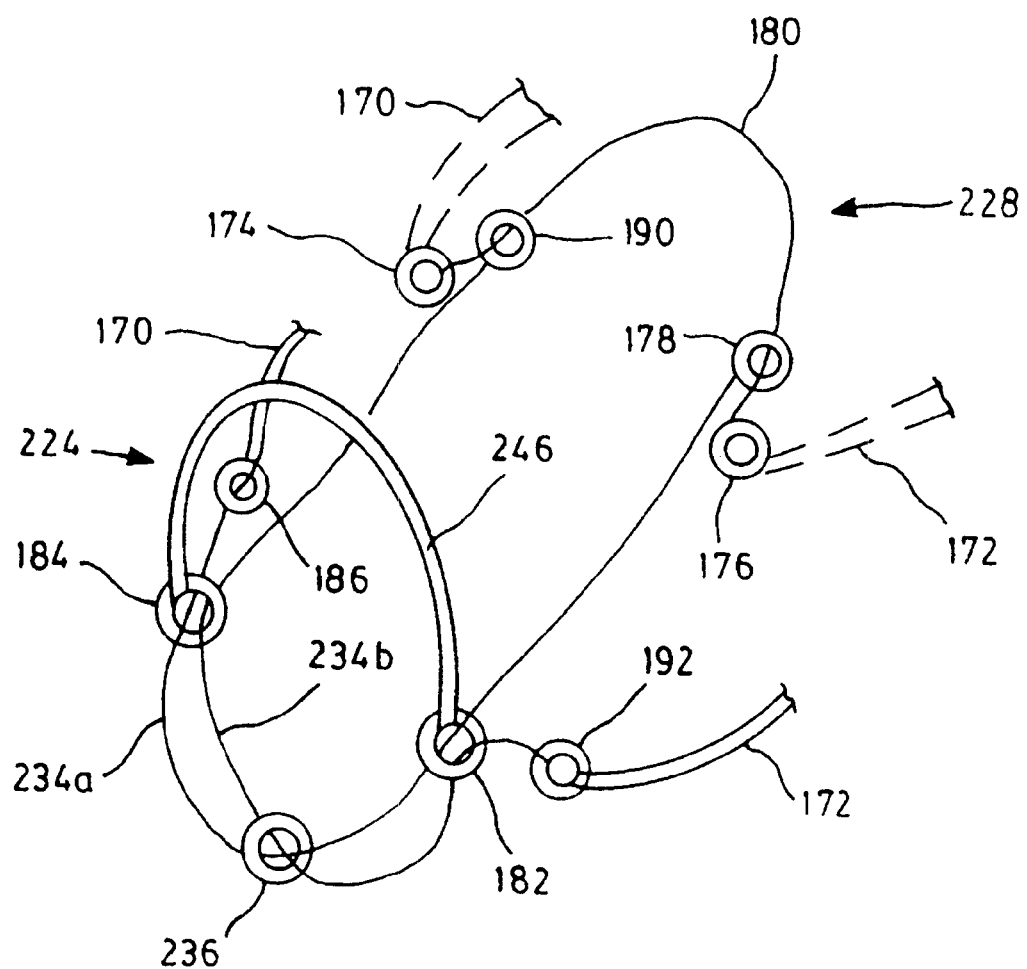
FIG. 12 is a schematic perspective view of the halter shown in FIG. 11.

Referring to FIGS. 11 and 12 therefore, a harness 220 includes an anchor portion 224 and a nape portion 228. To permit directional control from a set of reigns 170, 172, that combine to form a tether, the anchor portion 224 is formed from a pair of straps 234a, 234b that are interconnected by a nose band 246. The nape portion 228 comprises a head strap 180 that terminates in a pair or rings 174, 176 to permit connection of the reigns 170, 172 at alternate locations.

The strap 234a has a ring 178 at one end that is threaded on the head strap 180 and passes through a ring 182 at one end of 246. The strap 234a passes through a constraint 236 and a ring 184 at the opposite end of neckband 246. The strap 234a terminates in a ring 186 that provides attachment for the reign 170.

Similarly strap 234b is secured at one end to a ring 190 that is threaded onto the head strap 180. The strap 234b passes through the ring 184, constraint 236 and ring 182 to terminate at a ring 192 where the reign 172 can be secured.

When fitted, the nose band 246 passes over the muzzle of the horse and the headband passes across the back of the head behind the ears. The straps 234a, 234b extend from opposite ends of the headband 180 and cross beneath the mouth of the horse at constraint 236.

In a first configuration, the reigns 170, 172 are secured to the rings 186, 192 adjacent to the ends of the nose strap 246. In this configuration, the rings 174, 176 act as stops against the rings 190, 178 respectively. The application of a rearward force on reign 170 causes the tightening of the nose band 246 against the muzzle of the horse in the vicinity of the attachment of the reign 172. The ring 192 forms an abutment against the ring 182 and allows the force to be applied. This causes the horses head to turn in the direction of the force supplied by the reign 170. Similarly the application of a force on the reign 172 will guide the horse in the opposite direction and both reigns being pulled rearwardly causes the nose strap 246 to be pulled down and slow the horse down.

In an alternative configuration, as shown chain dot lines, the reigns 170, 172 are secured to the rings 174, 176 respectively. In that condition, the rings 192 and 186 form stops for the straps with the rings 190, 178 serving as the anchor points for the headband 228. A rearwardly applied force to the reigns 170, 172 causes the headband 180 to be forced toward the back of the head of the horse causing a rearward reflex leading to slowing of the horse. In this regard the headband 180 functions in a manner similar to the nape portion 128 in the previous embodiments. In this second configuration therefore, the rings 178, 190 serve as the force reversing anchors allowing the rearward tension in the reigns 170, 172 to apply a forward force against the back of the head.

Further modification of the halter for use with the horse is possible by adjusting the length of the head strap 180 so that the rings 178, 190 are positioned closer to the nose strap 246. In this way the mechanical advantage obtained by the application of forces through the reigns can be enhanced providing further control over the horse.

While only specific combinations of the various features and components of the present invention have been discussed herein, it will be apparent to those of skill in the art that desired sub-sets of the disclosed features and components and/or alternative combinations of these features and components can be utilized, as desired. For example, the various tensioners, buckles and connectors should be construed generally as adjustment means and connecting means, and such devices can be readily substituted for similar devices without departing from the scope of the invention. Further, straps should not be construed in a limiting sense, but can include a variety of narrow fabrics such as leather straps, nylon cord or webbing.

As illustrated by the preferred embodiments, the present invention provides a novel animal restraining halter which can be used in a gentle and humane manner to control a dog or other animal. The animal halter does not require the application of pain and inhibits damage to the animal by reducing or avoiding pressure against sensitive tissues such as in the front of the throat of the animal. In each embodiment, the halter can operate to convert a "pull" of a tether into a "push" against the back of the animal's neck which stimulates a proprioceptive or "righting" reflex in the animal and causes the animal to stop moving forward in order to lean back into the force pushing against the animal's neck. The halter can further control the animal by applying downward pressure to the top of the animal's snout, stimulating a behavioural response of submissiveness and can further restrain the animal by applying a constricting force around the animals muzzle.

What is claimed is:

1. A halter comprising an anchor portion to extend across a forward facing portion of an animals head, a nape portion connected to said anchor portion and extending across a rearward facing portion of an animals head and a tether connector connected to said nape portion, said anchor portion and said nape portion being connected such that when said connector is pulled rearwardly relative to said animal head, and in alignment with said nape portion, said nape portion pushes against said rearward facing portion.

2. A halter according to claim 1 wherein said nape portion and anchor portion slide relative to one another upon application of a rearward force to said tether connector.

3. A halter according to claim 2 wherein said nape portion is connected to said anchor portion at spaced locations on opposite sides of said head.

4. A halter according to claim 3 wherein said nape portion may slide relative to said anchor portion at each of said spaced locations.

5. A halter according to claim 4 wherein said nape portion is formed as a loop of flexible material and said tether connector is located on said loop between said spaced locations.

6. A halter according to claim 5 wherein a buckle is provided in said loop to permit adjustment thereof.

7. A halter according to claim 1 wherein said anchor portion includes a loop to extend around a muzzle of said animal and a pair of extensions connected to said loop and passing on opposite sides of said head, said extensions being connected at spaced locations to said nape portion.

8. A halter according to claim 7 wherein said loop is adjustable.

9. A halter according to claim 7 wherein said nape portion may slide relative to at least one of said extensions.

10. A halter according to claim 7 wherein said anchor portion is formed from a flexible strap and said strap passes through a constraint located intermediate the ends of said strap to define said muzzle loop.

11. A halter according to claim 10 wherein said strap crosses over itself in passing through said constraint.

12. A halter according to claim 11 wherein opposite ends of said strap diverge from said constraint to provide respective ones of said pair of extensions.

13. A halter according to claim 12 wherein a connector is located on each of said extensions to connect said anchor portion to said nape portion.

14. A halter according to claim 13 wherein said nape portion is formed by a flexible strap and each of said connectors includes an aperture to receive said strap and permit relative sliding movement of said strap relative thereto.

15. A halter according to claim 14 wherein one of said connectors is a buckle to permit separation of said nape portion from said extension and thereby facilitate placement of said nape portion.

16. A halter according to claim 12 wherein a pair of cheek straps extend from spaced locations on said muzzle loop to respective ones of said extensions.

17. A halter according to claim 1 wherein said anchor portion includes a nose band and a pair of straps extending from spaced locations on said nape portion to opposite ends of said nose band.

18. A halter according to claim 17 wherein each of said straps is slidingly connected to one end of said nose band and terminates adjacent an opposite end of said nose band.

19. A halter according to claim 18 wherein said straps pass through a constraint to define a muzzle loop.

20. A halter according to claim 17 wherein each of said straps is slidingly connected to said nape portion at said spaced locations.

21. A halter according to claim 20 wherein a pair of tether connectors are located on said nape portion adjacent said spaced locations.

22. A halter according to claim 21 wherein each of said straps terminates in a tether connector adjacent respective opposite ends of said straps.

23. A halter comprising an anchor portion formed from a first strap and a nape portion formed from a second strap, said first strap being formed in to a loop to define a muzzle loop intermediate the ends of said first strap with opposite ends of said first strap diverging from said muzzle loop to provide a pair of extensions, said second strap being connected to respective ones of said extensions to permit relative sliding movement between at least one of said extensions and said second strap, said second strap having a connector thereon for attachment to a tether.

24. A halter according to claim 23 wherein said muzzle loop is defined by said strap passing through a constraint.

25. A halter according to claim 23 wherein said second strap is formed as a loop and has a tether connector secured thereto.

26. A halter according to claim 25 wherein said strap is connected to each of said extensions in a manner to permit relative sliding movement.

27. A halter according to claim 25 wherein said second strap is arranged in serpentine fashion to define a pair of loops interconnected at a sliding connection.

28. A halter according to claim 27 wherein the relative size of said two loops is adjustable.

* * * * *